Sept. 9, 1958        F. C. DIETZ        2,851,487
PRODUCTION OF PHTHALIC ACIDS
Filed March 24, 1955
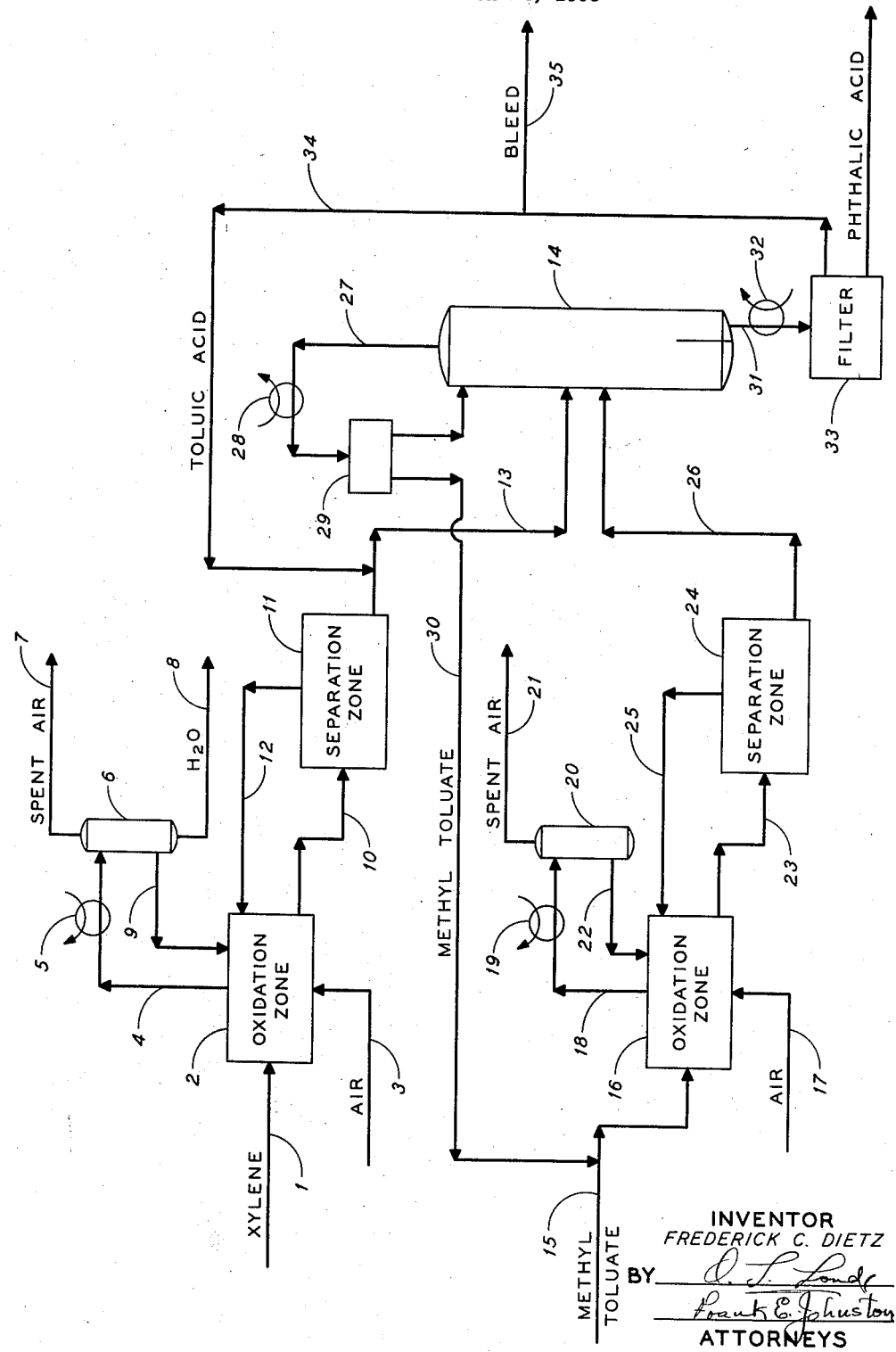
INVENTOR
FREDERICK C. DIETZ
BY
ATTORNEYS

United States Patent Office 2,851,487
Patented Sept. 9, 1958

2,851,487

PRODUCTION OF PHTHALIC ACIDS

Frederick C. Dietz, Lafayette, Calif., assignor to California Research Corporation, San Francisco, Calif., a corporation of Delaware Application March 24, 1955, Serial No. 496,522

2 Claims. (Cl. 260—524)

This invention relates to a process for producing phthalic acids. More particularly, it relates to a method for converting xylenes to phthalic acids at high yields by direct oxidation of liquid xylenes with air.

It is known that direct oxidation of xylenes in liquid phase with elemental oxygen, for instance, with air, results in the formation of a rather complex oxidation product consisting predominantly of toluic acid, containing some phthalic acid, and containing small amounts of a variety of intermediate oxidation products. The phthalic acid content of this reaction product is low, and commerical production of phthalic acids by oxidation of a xylene in liquid phase with air has not been feasible.

It is an object of this invention to provide a means for converting xylenes to phthalic acids using air as the oxidizing agent.

Pursuant to the invention, liquid xylene is oxidized with air in a first oxidation zone to produce a toluic acid; a lower alkanol toluate is oxidized with air in a second oxidation zone to produce a phthalic acid monoester; the toluic acid and the phthalic acid monoester are heated in a conversion zone to produce a phthalic acid and a lower alkanol toluate; the products are separated, and the ester is returned to the second oxidation zone.

The invention will be better understood by reference to the appended drawing, which is a diagrammatic illustration of a process flow suitable for the practice of the invention.

A liquid xylene, for example, para-xylene, is introduced through line 1 into a first oxidation zone 2. The xylene desirably contains a small amount of an oil-soluble oxidation catalyst. Air is passed into oxidation zone 2 through line 3. Oxidation zone 2 is maintained at a temperature of about 300° F. and under a superatmospheric pressure of about 50 p. s. i. g. Vapors are withdrawn from oxidation zone 2 through line 4, cooled by heat exchanger 5 to condense normally liquid components of the vapor, and passed into settling drum 6. Spent air is withdrawn from drum 6 through line 7. The normally liquid materials collected in drum 6 include water, xylene, and small amounts of toluic acid. A lower aqueous phase is formed in drum 6 and water is withdrawn from the bottom of the drum through line 8. A xylene phase containing some toluic acid is returned to oxidation zone 2 via line 9. An oxidation product is withdrawn from oxidation zone 2 through line 10 and passed into separation zone 11. Separation zone 11 may be either a filter or a distillation column. If separation is made by filtration, then the oxidation product stream contained in line 10 is cooled to a temperature below about 100° F. to precipitate solid toluic acid which is removed by filtration. If separation of the oxidation reaction product is made by fractional distillation, then xylene is removed overhead from the distillation zone and a kettle product consisting predominantly of toluic acid is recovered. Xylene separated in separation zone 11 is returned to oxidation zone 2 through line 12. Toluic acid recovered in separation zone 11 is passed through line 13 into conversion zone 14. A bleed stream of recycled xylene is desirably withdrawn from line 12, either discarded from the system, or treated by careful fractional distillation to remove partially oxidized impurities. Methyl toluate is passed through line 15 into a second oxidation zone 16. A small amount of oil-soluble oxidation catalyst is desirably present in oxidation zone 16. The oxidation zone 16 is maintained at a temperature of about 300° F. Air is passed into oxidation zone 16 through line 17. Vapors are withdrawn from oxidation zone 16 through line 18 and cooled to condense normally liquid components by passage through heat exchanger 19. The cooled vapor stream is passed into drum 20. Spent air is withdrawn from drum 20 through line 21. Methyl toluate collecting in drum 20 is returned to oxidation zone 16 through line 22. Both water and methyl toluate are collected in drum 20 and water is desirably separated from the methyl toluate prior to recycle. The oxidation reaction product comprising monomethyl phthalate and unconverted methyl toluate is withdrawn from oxidation zone 16 through line 23 and passed into separation zone 24. As in the case of separation zone 11, separation zone 24 may be either a filtration zone or a distillation zone. In either case monomethyl phthalate is separated from methyl toluate and the methyl toluate is returned to oxidation zone 16 through line 25. Monomethyl phthalate is passed from separation zone 24 through line 26 into conversion zone 14.

In conversion zone 14 the monomethyl phthalate produced in oxidation zone 16 is heated to a temperature in the range from about 300 to 600° F. with a large molar excess of toluic acid. Conversion zone 14 is conveniently a distillation column. The temperature required in the conversion zone and the degree of fractionation of the conversion product are such that rather simple distillation equipment, such as a pot still, is adequate.

In conversion zone 14 toluic acid and monomethyl phthalate react to produce phthalic acid and methyl toluate which is relatively volatile. Methyl toluate is removed overhead from conversion zone 14 through line 27, passed through heat exchanger 28 into reflux drum 29. A portion of the methyl toluate collected in reflux drum 29 is returned to the top of conversion zone 14 as reflux and the remainder is returned to oxidation zone 16 through line 30. Toluic acid containing dissolved phthalic acid is withdrawn from the bottom of conversion zone 14 through line 31, cooled by passage through heat exchanger 32 to a temperature such that the toluic acid is in a molten condition, but has a relatively low solubility for phthalic acid, e. g., about 250° F., so that a slurry of solid phthalic acid in liquid toluic acid is produced. The slurry is filtered at filter 33, leaving solid phthalic acid as a filter cake and yielding toluic acid as a filtrate. The toluic acid is returned to conversion zone 14 via lines 34 and 13. A portion of the toluic acid is desirably bled from line 34 through line 35 to prevent accumulation of impurities in conversion zone 14. The withdrawn toluic acid is desirably purified by converting it to the methyl ester which is recovered by distillation and used as makeup feed to oxidation zone 16 through line 15.

Oxidation zone 2, in which the oxidation of xylenes is conducted, is desirably operated at temperatures in the range from 200 to 400° F. and at a pressure sufficient to maintain the xylene in liquid phase. The oxidation of the xylene is ordinarily catalyzed by maintaining a small concentration of an oil-soluble salt of a polyvalent metal such as manganese or cobalt in the oxidation reaction mixture. Concentrations ranging from about .001% by weight to about 0.5% by weight are usually employed. Oxidation zone 16 is operated pursuant to the method described in U. S. Patent 2,653,165, i. e., at a temperature in the range from 200 to 500° F., and under a pressure sufficient to maintain the methyl toluate in liquid phase. An oil-soluble catalyst such as a salt of manganese, cobalt, or other multivalent metal, is also employed in oxidation zone 16.

Conversion zone 14 is operated so as to maintain a temperature in the range from 300 to about 600° F. in the bottom of the conversion zone. The upper portion of conversion zone 14 is at a lower temperature, usually in the range from about 300 to 500° F., i. e., approximately at or somewhat above the boiling point of the methyl toluate, but below the boiling point of the toluic acid.

Pursuant to the invention, xylenes may be converted to phthalic acids at very high yields. While it has been impossible to directly oxidize a xylene in liquid phase with air so as to produce appreciable yields of phthalic acid, this difficulty is overcome in the process of the present invention by carrying the direct oxidation of the xylene only as far as toluic acid, oxidizing the readily oxidizable methyl toluate to monomethyl phthalate, and then reacting the monomethyl phthalate with toluic acid to produce phthalic acid. Except for small losses sustained in operation, the only materials consumed in the process are xylene and air, and the only product produced is phthalic acid.

While the methyl ester of toluic acid charged to oxidation zone 16 is the preferred ester for use in the process, other lower alkanol toluates may be used instead and with substantially equivalent efficiency, e. g., ethyl toluate, propyl toluate, isopropyl toluate, and the like.

The process of the invention is especially well adapted to the production of isophthalic acid and terephthalic acid charging, in the case of isophthalic acid, meta-xylene to oxidation zone 2 and methyl meta-toluate to oxidation zone 16, and charging, in the case of terephthalic acid para-xylene to oxidation zone 2 and methyl para-toluate to oxidation zone 16.

The following examples illustrate the production of phthalic acid pursuant to the process of the invention.

*Example 1*

Xylene and methyl toluate are oxidized in liquid phase with air in separate oxidation zones as indicated in the appended drawing. Monomethyl phthalate and toluic acid are passed into conversion zone 14, the proportions of the two being 27 parts by weight of monomethyl phthalate and 40.8 parts by weight of toluic acid. 21.2 parts by weight of phthalic acids were produced. The conversion zone was operated at 420° F. and 100 mm. pressure during the run.

*Example 2*

The operation illustrated in the drawing was modified by conducting the oxidation of the xylene and the methyl toluate in a single oxidation zone. 126.1 parts by weight of a xylene feed containing 87% by weight of xylenes and 83.0 parts by weight of methyl toluate were charged to the oxidation zone and oxidized in liquid phase by contact with air. Oxidation products were withdrawn from the oxidation zone and fractionally distilled, separating an overhead product comprising xylene, a side cut consisting predominantly of toluic acid, a second side cut consisting predominantly of monomethyl phthalate, and a bottoms fraction. The toluic acid and monomethyl phthalate were passed into a conversion zone operated at about 400° F., and there converted to methyl toluate and phthalic acids. The methyl toluate was recycled. The operation was continuous and for each 100 parts by weight of xylene consumed, there was a net production of 73.3 parts by weight of phthalic acids, 18.3 parts by weight of toluic acids, 14.3 parts by weight of benzoic acid, 14.6 parts by weight of lower boiling products, and 16.1 parts by weight of bottoms. The xylene feed was impure and contained about 4.5% ethyl benzene and about 9% paraffins, which resulted in the production of materials other than the desired phthalic acid.

I claim:

1. A process for producing phthalic acids which comprises oxidizing an ester of toluic acid and a lower alkanol with air in an oxidation zone at a temperature in the range of 200° to 500° F. to produce a phthalic acid monoester, oxidizing a xylene with air at a temperature in the range of 200° to 400° F. to produce a toluic acid, heating the phthalic acid monoester and toluic acid in a conversion zone at a temperature in the range of 300° to 600° F. to produce a phthalic acid and an ester of toluic acid and a lower alkanol, distilling the ester of toluic acid from said conversion zone and returning it to said oxidation zone, and separating said phthalic acid from said conversion zone.

2. A process for producing phthalic acids which comprises oxidizing a methyl toluate with air in an oxidation zone at a temperature in the range of 200° to 500° F. to produce a monomethyl phthalate, oxidizing a xylene with air at a temperature in the range of 200° to 400° F. to produce a toluic acid, heating the monomethyl phthalate and toluic acid in a conversion zone at a temperature in excess of the boiling point of methyl toluate to produce a phthalic acid and a methyl toluate, distilling the methyl toluate from said conversion zone and returning it to said oxidation zone, and separating said phthalic acid from said conversion zone.

References Cited in the file of this patent

UNITED STATES PATENTS

| | | |
|---|---|---|
| 2,653,165 | Levine | Sept. 22, 1953 |
| 2,727,919 | Saunders | Dec. 20, 1955 |
| 2,772,305 | Levine et al. | Nov. 27, 1956 |

OTHER REFERENCES

Groggins: Unit Processes in Organic Synthesis, 4th ed., p. 620 (1952).